US012737153B2

(12) United States Patent
Diamond et al.

(10) Patent No.: US 12,737,153 B2
(45) Date of Patent: Sep. 15, 2026

(54) AUDIO ARBITRATION FOR AUDIO DEVICES

(71) Applicant: Ford Global Technologies, LLC, Dearborn, MI (US)

(72) Inventors: Brendan Francis Diamond, Naples, FL (US); Keith Weston, Canton, MI (US); Anthony Maraldo, Southgate, MI (US); Andrew Brown, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 18/813,632

(22) Filed: Aug. 23, 2024

(65) Prior Publication Data

US 2026/0056700 A1 Feb. 26, 2026

(51) Int. Cl.

| | |
|---|---|
| ***G06F 3/16*** | (2006.01) |
| ***H04R 5/04*** | (2006.01) |
| ***H04S 7/00*** | (2006.01) |

(52) U.S. Cl.

CPC ............... *G06F 3/165* (2013.01); *H04R 5/04* (2013.01); *H04S 7/303* (2013.01); *H04R 2499/13* (2013.01); *H04S 2400/13* (2013.01)

(58) Field of Classification Search

CPC .......... G06F 3/165; G06F 3/017; G06F 3/167; H04R 5/04; H04R 2499/13; H04R 1/406; H04R 3/00; H04R 3/005; H04R 3/12; H04R 2430/00; H04R 2430/01; H04S 7/303; H04S 2400/13; A61B 5/021; B60N 2/002; G06V 20/59; G10L 15/08; G10L 15/22; G10L 15/28; H04M 1/6083; H04M 3/4936; H04N 21/41422; H04W 4/80; H04W 8/06

See application file for complete search history.

(56) References Cited

U.S. PATENT DOCUMENTS

| | | | | |
|---|---|---|---|---|
| 8,050,419 | B2 * | 11/2011 | Gerlach | H04M 1/6083 381/86 |
| 8,594,341 | B2 | 11/2013 | Rothschild | |
| 8,639,508 | B2 * | 1/2014 | Zhao | G10L 15/08 704/235 |
| 8,718,797 | B1 * | 5/2014 | Addepalli | H04W 8/06 700/83 |
| 9,326,088 | B2 * | 4/2016 | Burke | H04M 3/4936 |
| 9,683,884 | B2 | 6/2017 | Cohen et al. | |
| 9,706,299 | B2 * | 7/2017 | Talwar | H04R 1/406 |
| 10,061,554 | B2 * | 8/2018 | Talwar | G10L 15/28 |
| 10,140,089 | B1 * | 11/2018 | Paranjpe | G06F 3/167 |
| 10,200,786 | B1 * | 2/2019 | Friedrich | H04R 3/00 |
| 10,269,350 | B1 * | 4/2019 | Hansen | G06F 3/167 |
| 10,319,371 | B2 * | 6/2019 | Zhao | G10L 15/22 |

(Continued)

FOREIGN PATENT DOCUMENTS

WO 2024056231 A1 3/2024

OTHER PUBLICATIONS

"CabinTalk® (Touring and above)", 2022 Honda Pilot, Honda Info Center, https://www.hondainfocenter.com/2022/Pilot/Feature-Guide/Interior-Features/CabinTalk/.

*Primary Examiner* — Gerald Gauthier

(74) *Attorney, Agent, or Firm* — Frank Lollo; Brooks Kushman P.C.

(57) ABSTRACT

A computer may, based on a user position of a first user, control audio output provided to a second user via a second user audio device.

20 Claims, 4 Drawing Sheets

(56) References Cited

U.S. PATENT DOCUMENTS

| | | | | |
|---|---|---|---|---|
| 10,419,868 | B2 * | 9/2019 | Hotary | G06V 20/59 |
| 11,535,256 | B2 * | 12/2022 | Ghannam | A61B 5/021 |
| 12,126,963 | B2 * | 10/2024 | Freund | H04W 4/80 |
| 12,269,371 | B2 * | 4/2025 | Roberts | B60N 2/002 |
| 12,587,804 | B2 * | 3/2026 | Jukic | H04R 3/005 |
| 2016/0019876 | A1 * | 1/2016 | Jeffrey | H04N 21/41422 700/94 |
| 2016/0171964 | A1 | 6/2016 | Kim et al. | |
| 2016/0171989 | A1 | 6/2016 | Gupta et al. | |
| 2016/0174010 | A1 | 6/2016 | Mohammad et al. | |
| 2018/0048955 | A1 | 2/2018 | Geiger et al. | |
| 2019/0246235 | A1 * | 8/2019 | Bruser | G06F 3/017 |
| 2019/0278555 | A1 * | 9/2019 | Carvajal | G06F 3/165 |
| 2019/0281389 | A1 * | 9/2019 | Gordon | G06F 3/167 |
| 2019/0289417 | A1 * | 9/2019 | Tomlin | G06F 3/165 |
| 2019/0372541 | A1 * | 12/2019 | Friant | G01S 5/18 |
| 2020/0258306 | A1 | 8/2020 | Fortunapour et al. | |
| 2021/0193162 | A1 * | 6/2021 | Hook | G10L 17/00 |
| 2022/0095046 | A1 | 3/2022 | Winton et al. | |
| 2022/0159403 | A1 | 5/2022 | Sporer et al. | |
| 2023/0080306 | A1 | 3/2023 | Cho | |
| 2023/0156290 | A1 * | 5/2023 | Yelton | G06F 3/165 381/104 |
| 2023/0164509 | A1 | 5/2023 | Sporer | |
| 2024/0005900 | A1 | 1/2024 | Salter et al. | |
| 2026/0056700 | A1 * | 2/2026 | Diamond | G06F 3/165 |

* cited by examiner

AUDIO ARBITRATION FOR AUDIO DEVICES

BACKGROUND

A computer can output one or more audio streams via respective audio devices such as speakers, headphones, etc., thereby providing audio content for listeners. For example, a computer in a vehicle can output audio streams for vehicle occupants. Audio streams can include a wide range of content such as vehicle data, vehicle service notices, navigation maps, entertainment data such as podcasts, movies, video games, and the internet via web browsers, and/or cellular telephone data such as text messages.

DETAILED DESCRIPTION

Figure 1:
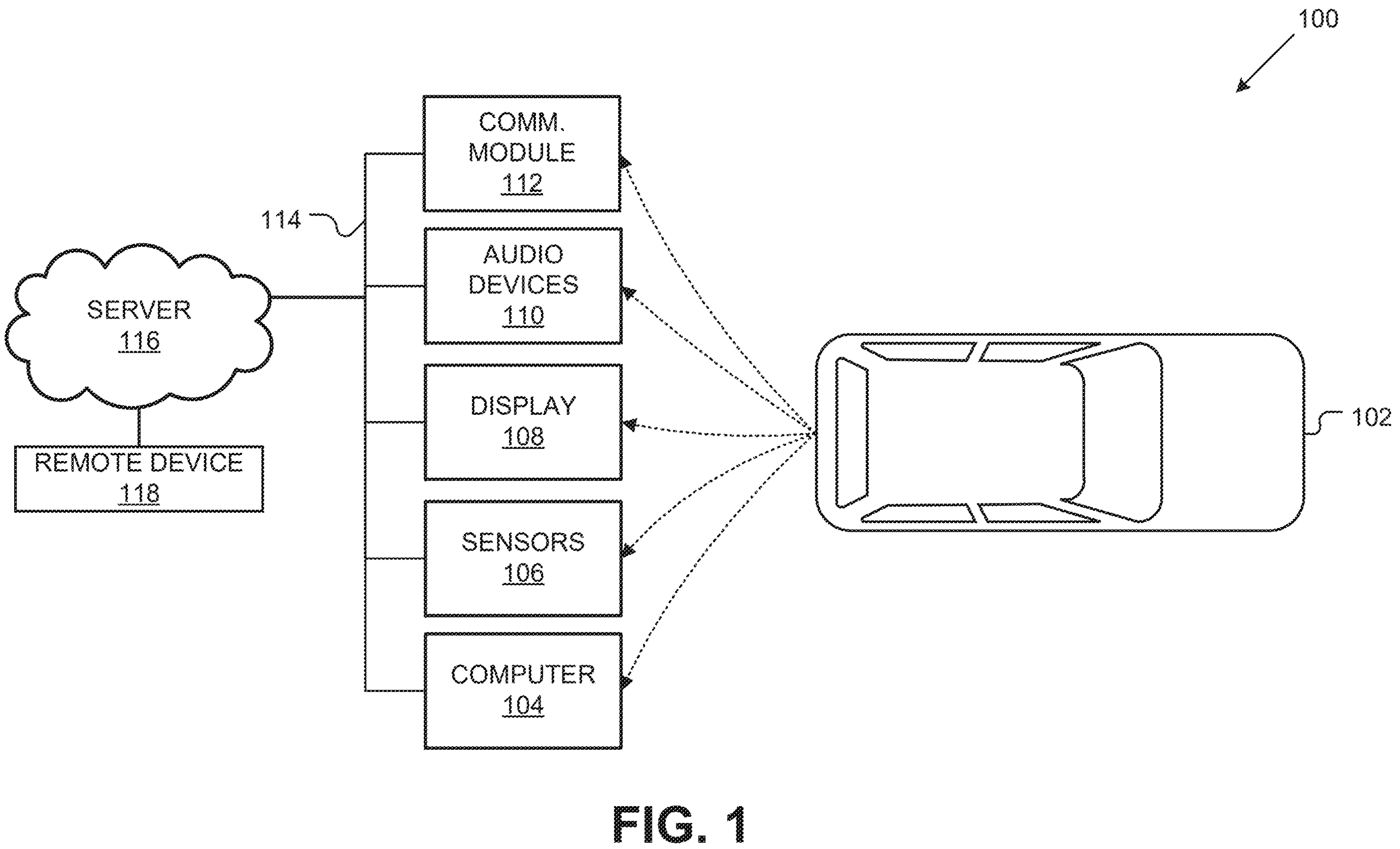
FIG. 1 is a block diagram of an example vehicle system.

The audio system described herein enhances scenarios wherein multiple users may listen to different streams of audio data simultaneously. For example, techniques described herein can provide for control of one or more audio streams associated with one or more users such as vehicle occupants. Control of audio data delivery as described herein can facilitate intra-vehicle communications, (e.g., between users), and/or between a device such as a vehicle human-machine interface (HMI) and one or more users. Respective users such as vehicle occupants can be associated with an audio device such as a speaker directed at a user's position or location such as a location in a vehicle cabin at which the user is sitting (hereinafter a user's "cabin location"), or a headset or headphones (e.g., wireless earbuds) or the like. Audio data can be provided to one or more respective audio devices according to parameters for a user and/or an event (e.g., a vehicle being approached by a second vehicle such as a law-enforcement, medical, or fire response vehicle) and/or or state (e.g., a vehicle state such as parked or moving).

Accordingly, included in the present disclosure is a system comprising a computer including a processor and a memory, the memory storing instructions executable by the processor to: based on a user position of a first user, control audio output provided to a second user via a second user audio device.

The user position may be a gesture including the first user's head, hand, and/or arm.

The user position may be an eye movement.

The eye movement may be an adjustment of the eye of the first user to a viewing direction toward a vehicle component.

The eye movement may be an adjustment of the eye of the first user to a viewing direction toward the second user.

The audio output may be controlled based on an external event in addition to the user position of the first user.

The external event may be a proximity of another vehicle.

The external event may be a traffic condition.

The audio output may be controlled based on a predetermined permission.

The permission may be based on input by the second user.

The permission may be based on input by the first user.

Controlling the audio output may include adjusting a volume of the audio output.

Controlling the audio output may include pausing the audio output.

Controlling the audio output may include changing the audio output from a first audio program to a second audio program.

Audio output may be controlled only when a volume of the audio output is above a specified volume threshold.

A method comprises: based on a user position of a first user, controlling audio output provided to a second user via a second user audio device.

The user position may be a gesture including the first user's head, hand, and/or arm.

The user position may be an eye movement.

The audio output may be controlled based on an external event in addition to the user position of the first user.

The audio output may be controlled based on a predetermined permission.

Exemplary System Elements

With reference to FIG. 1, a vehicle system 100 includes a vehicle 102. The vehicle system 100 is presented as an example environment. However, it will be understood that the present disclosure may apply to other architectures and/or systems, such as a home entertainment system; an aircraft infotainment system, etc. The vehicle system 100 includes a computer 104 having a memory that includes instructions executable by a processor of the computer 104 to carry out processes and operations including as described herein. For example, the memory stores instructions executable by the processor, including instructions to, based on a position of a first user (e.g., an eye gaze direction or movement of the first user), control audio output provided to a second user via a second user audio device.

The computer 104 may be communicatively coupled via a vehicle communication network 114 with sensors 106, displays 108, audio devices 110, and other components in the vehicle 102. The vehicle 102 may be any passenger or commercial automobile such as a car, a truck, a sport utility vehicle, a crossover, a van, a minivan, a taxi, a bus, ICE (Internal Combustion Engine), BEV (Battery Electric Vehicle), hybrid, a PHEV (Plug-in Hybrid Electric Vehicle), etc.

As mentioned above, the vehicle computer 104 includes a processor and a memory. The memory includes one or more forms of computer readable media, and stores instructions executable by the computer 104 for performing various operations, including as disclosed herein. For example, the computer 104 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation (e.g., an ASIC for processing sensor data and/or communicating the sensor data). In another example, the computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design to describe digital and mixed-signal systems such as FPGA and ASIC. For example, an ASIC is manufactured based on VHDL programming provided pre-manufacturing, whereas logical components inside an FPGA may be configured based on VHDL programming (e.g., stored in a memory electrically connected to the FPGA circuit). In some examples, a combination of processor(s), ASIC(s), and/or FPGA circuits may be included in a computer 104. The computer 104 may be multiple computers coupled together.

The memory can be of any type (e.g., hard disk drives, solid state drives, servers, or any volatile or non-volatile media). The memory can store the collected data sent from the sensors 106. The memory can be a separate device from the computer 104, and the computer 104 can retrieve data stored by the memory via the network 114 in the vehicle 102 (e.g., over a CAN bus, a wireless network, etc.) Alternatively or additionally, the memory can be part of the computer 104 (e.g., as a memory of the computer 104).

The computer 104 may include programming to operate one or more of vehicle components such as propulsion (e.g., control of speed in the vehicle 102 by controlling one or more of an internal combustion engine, electric motor, hybrid engine, etc.), steering, interior and/or exterior lights, displays 108, audio devices 110, etc., as well as to determine whether and when the computer 104, as opposed to a human operator, is to control such operations.

The computer 104 is generally arranged for communications on the vehicle communication network 114 that can include a bus in the vehicle 102 such as a controller area network CAN or the like, and/or other wired and/or wireless mechanisms. Alternatively or additionally, in cases where the computer 104 actually comprises a plurality of devices, the vehicle communication network 114 may be used for communications between devices represented as the computer 104 in this disclosure. Further, as mentioned below, various controllers and/or sensors 106 may provide data to the computer 104 via the vehicle communication network 114.

Via the vehicle network 114, the computer 104 may transmit messages to various devices and/or components in the vehicle 102 and/or receive messages (e.g., CAN messages) from the various devices and/or components (e.g., sensors 106, ECUs, etc.) Alternatively, or additionally, in cases where the computer 104 actually comprises a plurality of devices, the vehicle communication network 114 may be used for communications between devices represented as the computer 104 in this disclosure. Further, as mentioned below, various controllers and/or sensors 106 may provide data to the computer 104 via the vehicle communication network 114.

The sensors 106 may provide data about occupants of the vehicle 100. The sensors 106 can be cameras and can detect electromagnetic radiation in some range of wavelengths. For example, the sensors may detect visible light, infrared radiation, ultraviolet light, or some range of wavelengths including visible, infrared, and/or ultraviolet light. For example, the camera can be a charge-coupled device (CCD), complementary metal oxide semiconductor (CMOS), or any other suitable type.

The vehicle 102 may include a display 108. The display 108 displays visual data (e.g., two-dimensional visual data) to occupants of a vehicle 102. The display can be any suitable type for displaying content legible to the respective occupants, (e.g., light-emitting diode (LED)), organic light-emitting diode (OLED), liquid crystal display (LCD), plasma, digital light processing technology (DLPT), etc. The display 108 can display visual data in monochrome or color via a screen and the visual data can be updated at a frame rate, which can be 60 frames per second, for example. Displayed visual data can be a static image, where the majority of the two-dimensional area does not change from frame to frame, or a dynamic image, where the majority of the two-dimensional area changes from frame to frame. Visual data to be displayed on the display 108 can be generated by a display controller. The display controller is a computing device such as an ECU or the like that can receive data to be displayed on the display 108 in a visual format from computer 104, other vehicle ECUs, or from an external computing device 118 via server 116.

The display 108 may allow for user interaction. For example, the display 108 may be a conventional touchscreen display, such that a user may provide input to the computer 104 via the display screen (e.g., a set of content data to be outputted by the display 108 may be selected via the display screen 108). The touchscreen may be any suitable type for receiving an input from a user (e.g., resistive, capacitive, infrared, etc.).

Figure 2:
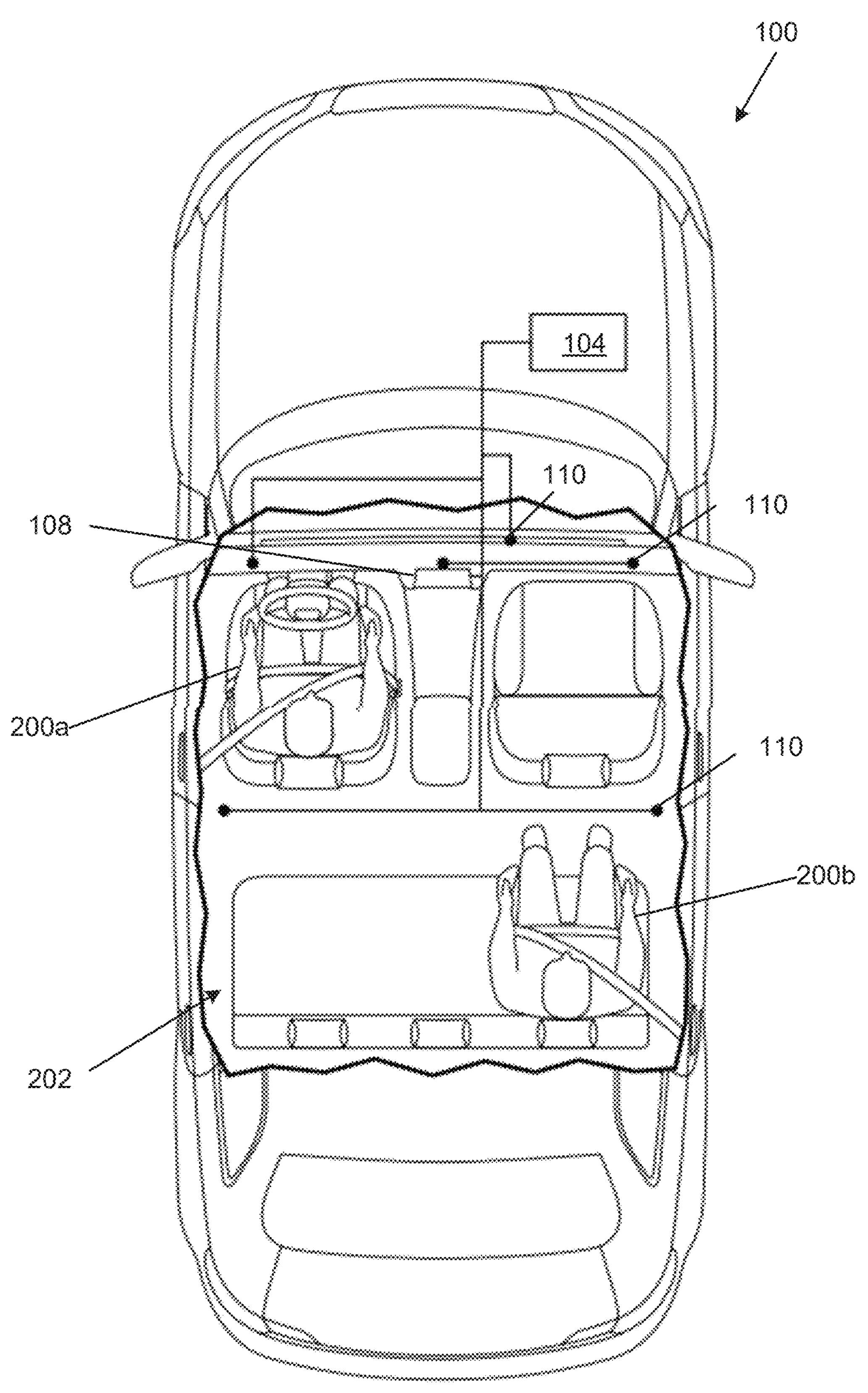
FIG. 2 is a top diagrammatic view of the vehicle with the cabin exposed for illustration.

Referring now to FIG. 2 in addition to FIG. 1, an audio device 110 can be any suitable device configured to output sound to users such as a first user 200*a* and a second user 200*b* who are occupants of the vehicle 102. For example, audio devices 110 may be speakers, personal devices (e.g., headphones), etc. Speakers are electroacoustic transducers that convert an electrical signal into sound. The speakers can be any suitable type for producing sound audible to the respective user 200 (e.g., dynamic). The portable device may be any suitable device for emitting sound to a single user 200 (e.g., headphones such as in-ear or over-the-ear, a portable speaker, etc.). The personal device may be connected to the vehicle network 114 via a wired connection such as an audio jack and/or via or a wireless connection such as Bluetooth™.

The computer 104 may identify one or more audio devices 110. Where the audio device 110 is not a vehicle audio device but rather is a portable device that can be paired/unpaired and/or plugged/unplugged with a user device and/or the computer 104 (e.g., the audio device is a personal headset) the computer 104 may identify the audio device 110 in the vehicle based on detecting the audio device 110 being paired with or plugged to the computer 104 and/or based on sensor data. For example, the sensors 106 may collect one or more images of the users 200 including an audio device 110. The computer 104 may then input the images to a neural network trained to identify audio devices 110 in the image. Where the audio device 110 is a vehicle audio device 110, the vehicle 102 may identify the audio devices 110 based on stored data about the vehicle audio devices 110 such as stored data about speakers and their locations in the vehicle 102.

The computer 104 may control the audio output of an audio device 110. That is, the computer 104 may select a set of parameters for provision of an audio stream including a volume (i.e., decibel level) of the audio stream and location(s) of output of the audio stream (i.e., a specification of one or more audio devices 110 for outputting the audio stream). The computer 104 may control one or more parameters of delivering audio content, wherein one or more other parameters may be unchanged. For example, to control an audio device 110 the computer 104 may decrease the volume of an audio stream and/or may change which audio devices 110 are outputting the audio stream. The computer 104 may therefore control the audio output by adjusting a volume of the audio output, pausing the audio output, and changing the audio output from a first audio stream to a second audio stream (each of which will be described in turn below). The computer 104 may, for example, control the audio output based on a lookup table specifying how to control the audio output under given external events and/or vehicle states. As another example, the computer 104 may control the audio output according to user input (e.g., the computer 104 may be instructed to always pause audio output when the first user 200*a* is speaking). The computer 104 may control the audio output of the audio device 110 based on a user position or an external event as described below.

FIG. 2 shows a cabin 202 of the vehicle. Vehicle users 200 may be associated with audio devices 110 in the cabin 202. That an audio device 10 is associated with a user 200 means that the audio device 110 is designated for and is assumed to be used by that user 200. The computer 104 may store user associations such that audio devices 110 are specified for respective users 200. The computer 104 may associate an audio device 110 with a user 200 based on the user 200 wearing the device 110 (e.g., wearing headphones) as may be determined any suitable by image recognition technology, for example, such as including a neural network as mentioned above.

The computer may associate an audio device 110 with a user 200 based on placement of the audio device 110 relative to the cabin location of the user 200 (e.g., front area of a cabin versus rear area, headphones placed over ears, etc.). The computer 104 may store cabin locations of vehicle audio devices 110 (e.g., as specified by a vehicle manufacturer and/or as indicated by user input) typically at a closest occupant cabin location. For example, if the first user 200*a* is in an operator's cabin location of the vehicle 102, then any audio devices 110 (e.g., speakers) supported by surfaces of the vehicle 102 which are closer to the operator's cabin location than devices 110 at any other cabin location. Alternatively or additionally, a device 110 oriented to emit sound toward a cabin location may be associated with that cabin location, and hence with a user 200 at that cabin location.

As seen in FIG. 2, the vehicle cabin 202 can include a plurality of audio devices 110. The cabin 202 can house occupants or users 200 of the vehicle 102. The cabin 202 includes one or more cabin locations (e.g., one or more of the cabin locations disposed in a front row of the cabin 202 and one or more of the cabin locations disposed in a second row behind the front row). The cabin 202 may also include cabin locations in a third row (not shown) at a rear of the cabin 202. The position and orientation of the cabin locations and components thereof may be selected by the user 200. In the present example, user 200*a* is located in an operator's cabin location and user 200*b* is located in a rear right cabin location.

An audio device 110 may be a portable user device (e.g., a smartphone or the like) and/or can be mounted in the vehicle cabin 202. For example, an audio device 110 may be mounted to the dashboard, console, etc. The audio devices 110 may be personal audio devices (e.g., wireless headphones) or may be dedicated internal audio devices (e.g., vehicle speakers) as shown. The audio devices 110 may be supported by the vehicle 102 in locations about the vehicle cabin 202 such that audio output may be provided at a similar volume (e.g., by outputting a same number of decibels) by users 200 at different cabin locations. For example, audio devices 110 (e.g., those audio devices mounted in the vehicle 102) may be positioned on the dashboard, console, sides of the vehicle 102, etc.

Audio devices 110 may be configured for audio isolation, which means that audio is output by an audio device 110 such that it is heard at a first volume by a first user, wherein the first volume is intended to render the audio content intelligible to the first user 200*a*, and a second user 200*b* will not hear the audio or will hear the audio at a second, lower, and typically less intelligible, volume. Audio isolation may be achieved, for example, where an audio stream is output to a personal audio device 110 such as headphones, wherein a user 200 receives sound from the audio stream and other sounds are prevented or reduced in reaching the user's ears. In some examples, audio isolation may be achieved by changing the audio output mode of audio streams to output the audio streams via specified audio devices 110 (e.g., vehicle speakers) that are arranged to cancel or interfere with sound from one another. For example, if the audio device 110 is a speaker, the computer 104 may output the audio stream at a volume that is typically intelligible to the respective user and inaudible or at least unintelligible to other users 200, which may be facilitated by the speaker being directed to the cabin location 208 in which that user 200 is sitting. Additionally, the computer 104 may execute a suitable active-noise-cancellation algorithm to produce cancellation audio data that cancels (i.e., reduces) the audio data stream from another user 200. An active-noise-cancellation algorithm may either invert or phase shift the sound wave contained in the audio stream, resulting in the cancellation audio data. Outputting the cancellation audio data can cause destructive interference with the sound that produced the input audio data. For example, cancellation audio data for cancelling the first audio stream may be added to the second audio stream in order to isolate (i.e., minimize or reduce interference for) the second user 200. Such techniques can be useful where users 200 do not have access to personal audio devices 110 (e.g., Bluetooth headphones) which would generally perform the function of audio isolation by blocking out those audio streams that the user 200 does not wish to listen to. In examples where the user 200 does have access to personal audio devices 110, the computer 104 may associate those personal audio devices 110 with specific users 200 (e.g., where the user connects headphones to the computer 104 via Bluetooth and specifies that the headphones belong to the user 200).

The computer 104 may control audio output provided to a second user 200*b* based on a position of a first user 200*a*. A user position as that term is used herein encompasses a movement, that is the user positioning themselves, such as a gesture including the first user's 200*a* head, hand, and/or arm. The computer 104 may control audio output based on a determination that the position of the first user 200*a* was intended by the first user 200*a* to attract the attention of the second user 200*b*. That is, when the first user 200*a* makes a movement to attract the attention of the second user 200*b* (e.g., such that the first user 200*a* may converse with the second user 200*b*), the computer may detect the user position and control the audio output. The computer 104 may detect the user position from data collected by the sensors 106 such as image data provided from camera sensors 106 in a vehicle cabin 202. To detect and interpret user 200 positions, possibly including movements, the computer 104 can input image data to any suitable image recognition algorithm, such as one that includes a deep neural network trained to determine gestures from image data. In an example, the neural network is trained to detect and identify positions (i.e., classify a user position such as movement or eye gaze direction). For example, a position classification could be of a movement or gesture that a first user 200*a* intends attract the attention of a second user 200*b*. For example, the neural network may be trained to recognize a position including a user 200 movement bringing their first up to their mouth (e.g., coughing) as not intended to attract the attention of another user and therefore not warranting control of audio output. As another example, the neural network may be trained to recognize a wave of a hand by a first user 200*a* toward a second user 200*b* as intended to attract the attention of the user 200 which would warrant control of audio output. The computer 104 may store a lookup table or the like specifying classifications of user positions (e.g., hand wave directed at another user, nodding of the head towards another user, adjusting a headset, etc.) output by the image recognition algorithm as warranting control of audio output or not warranting control of audio output.

A user 200 position classified by an image recognition algorithm may be an eye movement. The computer 104 may detect eye movements including gaze directions of the users 200. The computer 104 can, first, detect user 200 eyes using any suitable eye-detection algorithm (e.g., a shape-based technique using an elliptical eye model or a complex eye model; a feature-based technique such as detecting local features, detecting a filter response, or detecting the pupil and iris; an appearance-based technique; hybrid techniques of the foregoing; etc.) The computer 104 can then detect a gaze direction of the user 200 using any suitable gaze-tracking algorithm (e.g., model-based techniques, interpolation-based techniques, appearance-based techniques, visible light-based techniques, etc.). The computer 104 may, for example, control the audio output when it detects the first user 200*a* looking at the second user 200*b* directly (i.e., when the first user 200*a* directs their gaze toward the body of the second user 200*b*) The eye movement may also be an adjustment of the eye of the first user 200 to a viewing direction toward a vehicle component (e.g., viewing the second user 200 via a rear-view mirror). The computer 104 may determine a user's gaze direction. For example, a visible-light image or infrared image from a camera 115 depicting the user can be input to a machine-learning program that is trained to recognize eye gaze direction from image(s). The eye gaze direction can be specified by a line drawn from a point on a user's eye (e.g., a center point of a pupil, where the line is typically perpendicular to a plane tangent to the point on the user's eye). Thus, a user's gaze direction can be determined to be directed toward another user 200 or a vehicle component when the line defining the gaze direction intersects with the other user 200 or vehicle component. Further, a gaze direction can be specified to be toward another user 200 or vehicle component when an angle between a line defining the gaze direction and a second line defined by the point on the user's eye and a point on the surface of the other user 200 or vehicle component is less than a specified threshold (e.g., 5°, 10°, etc.). The computer 104 may, as noted above, store a lookup table or the like specifying whether control of audio output is warranted for detected user positions.

As mentioned above, the computer 104 may control audio output in response to detecting a user position. That is, when the computer 104 detects a user position which warrants control of audio output (e.g., as specified by a stored lookup table) the computer 104 may control the audio output in any way described above (e.g., switching from a first audio stream to a second audio stream, adjusting volume of the audio stream, pausing the audio stream, etc.) The computer 104 may control the audio output according to a further lookup table. That is, depending on the user position detected, the computer 104 may control the audio differently (e.g., a user 200*a* tapping their ear may cause the computer 104 to switch the audio output to a second audio stream whereas a hand wave may pause the audio stream).

The computer 104 may control the audio output only when a volume of the audio output is above a specified volume threshold. That is, the computer 104 may only control audio output in response to detecting a user position or event warranting control when the volume of an audio stream to which the user 200 is listening is in excess of a specified decibel level. For example, if the threshold is twenty decibels, the computer 104 will only control audio output for a user 200 if the audio device 110 associated with the user 200 is outputting audio at a volume at or in excess of twenty decibels. The threshold decibel level is typically specified based on empirical testing or simulation to be a decibel level deemed likely to interfere with the user 200 hearing and understanding other sounds (e.g., voices of other users). Alternatively or additionally, the threshold may be established by user input. For example, the computer could output sounds at varying decibel levels, and a user 200 could provide input selected one of the decibel levels for the threshold, perhaps while another user is talking or sounds simulating another user's voice at a specified decibel level are played, and/or the user could simply input a decibel level for the threshold, such as "soft," "medium," or "loud," where the user selection would then be correlated to a decibel level for the selection.

The computer 104 may register the audio devices 110 prior to controlling audio output from the audio devices 110. Registering an audio device 110 means storing its identity (e.g., a network identifier or the like) in a memory or data store of the computer 104, along with an indicator or flag that the computer 104 is provided with authorization to control the audio output of the audio device 110. Registration may be accomplished by a computer 104 for detecting an audio device 110 (e.g., detecting a pairing via Bluetooth or the like, and then prompting for user input to perform the registration). For example, to prompt a user 200 of the audio device 110 to provide input authorizing the computer 104 to control audio output of the device 110. Alternatively, or additionally, the computer 104 may register devices 110 without user input. For example, the computer 104 may register the device 110 upon a sensor 106 detecting the device 110, (e.g., a device 110 could be recognized in a Bluetooth pairing and based on a stored identifier for the device and a past registration or user set up be registered).

Registration can also establish different permissions for the computer 104 to control the audio device 110. As used herein, a "permission" refers to the ability to control audio output of a device 110 granted to the computer 104. A permission is typically specific to a device 110, that is, governance the computer 104 controlling the device 110 in the vehicle cabin 202. Further, permissions for a device 110 can vary depending on various scenarios for the device 110 in the cabin 202. A device 110 scenario refers to one or more attributes of device 110 usage, such as an identity of a user 200 using the device 110, a user position of the device 110, a type of content being streamed over the device 110, etc. A user 200 may specify a permission to specify the scenarios in which the computer 104 may control audio output of a device 110. For example, a user 200*a* may specify that their audio device 110 (e.g., personal headphones) is not to be controlled by the computer 104 in response to the position of another user 200*b*, but may be controlled in response to the position of a different user 200. As another example, user 200*a* (e.g., an operator of the vehicle 102) may specify that an audio device 110 of another user 200*b* is allowed no permission and may have its audio output controlled by the computer 104 with no limitation. In addition to user input, permissions may be specified by a cabin location of an audio device 110, the type of audio device 110 (e.g., personal headphones or vehicle speakers), identity of the user 200 of the audio device 110, etc. As an example, an audio device 110 associated with the user 200 in a driver's cabin location may have permissions that allow for different audio control than other users (e.g., the computer 104 may only control output based on more than one internal/external event). As another example, an audio device 110 that is a personal audio device 110 (e.g., headphones) may have different permissions than non-personal audio devices 110 (e.g., vehicle speakers). A permission or set of permissions for a device 110 could be stored in a memory of the computer 104 (e.g., in a table or the like).

The computer 104 may detect external events. As used throughout this disclosure, an "external event" is an event, occurrence, or activity, other than a position of a user 200 that is detectable by sensors 106. The computer 104 may determine that an event warrants, or is a factor that in combination with one or more other events, warrants, control of audio output. External events may include events such as proximity of another vehicle (e.g., a law-enforcement, fire response, medical vehicle, any vehicle with right of way, etc.), traffic conditions, the vehicle 102 approaching a specified destination on a navigation route, etc. The computer 104 can detect an external event via any suitable mechanism, such as object detection based on data from sensors 106, vehicle to vehicle or vehicle to infrastructure communications, communication from a remote device 118, etc.

The computer 104 may detect internal events. In this disclosure, an "internal event" is a position of a user 200 that is detectable by sensors 106 as described above.

The computer 104 may control the audio output based on a vehicle state. "Vehicle state" herein means a status of the vehicle 102 as described by physical measurements of the vehicle 102 and/or environment around the vehicle 102. For example, a vehicle state can include one or more of an ambient temperature around the vehicle 102, the cabin temperature of the vehicle 102, a speed of the vehicle 102, a status of movement (e.g., moving or nonmoving and/or parked) of the vehicle 102, etc. The computer 104 may determine a vehicle state based on data collected by sensors 106.

The computer 104 may determine a vehicle state or states in real-time or near real-time based on physical measurements of the vehicle 102 and/or an environment in and/or around the vehicle 102. For example, the computer 104 may determine that the vehicle 102 in in a "moving state" when the vehicle 102 is in motion on a roadway. As another example, the vehicle 102 may be in a "parked" state when the vehicle transmission is in park. As a further example, the vehicle may be in a "navigation" state when the computer 104 is displaying instructions for route navigation to a user 200 (e.g., a user has requested directions to a destination).

The computer 104 may control the audio output based on one or more control parameters. A "control parameter" (or simply "parameter") in this context is a specification of how the computer 104 can control audio output for specific audio devices 110. That is, what control the computer 104 can have over the audio output in response to external or internal events and/or permissions (i.e., in the present examples parameters can include internal events, external events, vehicle states, and/or permissions). A parameter can specify a permitted control (e.g., stop or pause output, control volume, etc.), a system state such as a vehicle state and/or external events under which the control is permitted (e.g., vehicle parts, vehicle moving, vehicle speed over a threshold, approaching vehicle detected, etc.) and an internal event (e.g., user 200 position or gesture) based on which the computer 104 is permitted to exercise the control over device 110 (e.g., hand wave, eye movement, etc.). Table 1 below illustrates an example lookup table specifying parameters (e.g., classifications of user positions, permissions, external events, and vehicle states) as well as interpretations of the respective example parameters:

TABLE 1

| Parameter(s) | Control Output |
|---|---|
| Internal Event: Hand wave towards user | Control audio device of that user to reduce volume. |
| Internal Event: Gaze direction towards user | Control audio device of that user to reduce volume. |
| Permission: Do not disturb | Do not control audio output in response to user position. |
| Permission: Ignore First User | Do not control audio output in response to user position of first user. |
| Permission: Operator Override | Override permissions preventing audio output control when operator user position (e.g., operator is a person in a driver's position) detected. |
| External Event: Approaching ambulance | Override permissions (if any) and control audio output. |
| External Event: Unexpected Traffic | Override permissions and control audio output. |
| State: Moving | No effect on audio output control |
| State: parked | Control audio output when vehicle operator speaking. |
| Internal events: Hand wave towards user and gaze direction towards user | Control audio device of that user to pause audio output. |
| Permissions: Do not disturb and Operator Override and Internal event: Gaze direction towards user | Control audio device of that user to reduce volume. |

Table 1 provides examples of how the computer 104 may control audio output based on parameters. That is, the computer 104 may detect one or more events (e.g., internal and/or external events) vehicle states, and/or one or more permissions, and can determine an appropriate control output for a device 110 based on the event (e.g., based on a lookup table such as Table 1). For example, the first row of Table 1 illustrates that an operator's hand wave toward a user can cause the computer 104 to provide a control output to reduce a volume of that user's audio device 110. In another example, the last row of Table 1 illustrates that a combination of "do not disturb" and "operator override" permissions and a "gaze direction towards user" internal event can cause the computer 104 to provide a control output to reduce a volume of a user's audio device 110. In this example, the "do not disturb" permission indicates that the audio device 110 is not to be disturbed or subject to control by the computer 104, but the "operator override" permission is given priority over the "do not disturb" permission, so that when the "gaze direction towards user" internal event is detected, the computer 104 can reduce the volume of the user device 110.

Thus, as illustrated, the computer 104 may consider one parameter, as shown in Table 1, or multiple parameters, to determine the control output for the audio device 110. In addition to specifying a control output based on the occurrence of each parameter, the lookup table or the like may specify control output based on a combination of parameters detected together. For example, an entry in the lookup table may specify that, where the sensors 106 detect two user positions (e.g., a hand gesture and a gaze direction), the computer 104 mutes audio output, whereas if only one of the internal events is occurring the computer 104 only reduces volume of the audio output.

Permissions may be specified by input by the first user and/or based on input by the second user. As an example, if the user 200*a* of an audio device 110 specifies to the computer 104 (e.g., via input by the audio device 110, display 108, etc.) that they do not wish to be disturbed by a specific user 200*b* and/or if the user 200*b* specifies that the user 200*b* should be ignored for possible control of the device 110, then any position of the user 200*b* could be ignored by the computer 104 for control the audio output of the audio device 110 of the user 200*a*. As another example, a user 200*b* (e.g., a passenger) could specify that they are not to be disturbed by any other users 200. Yet further, even if the user 200*b* has specified no disturbance, examples are possible in which a user 200*a* (e.g., vehicle operator) specifies that the permissions of user 200*b* be overridden when user 200*a* attempt to attract their attention, the computer 104 will control the audio output of the audio device 110 when user 200*a* makes a movement intended to attract the attention of user 200*b*.

Permissions may be based on audio devices 110. That is, the computer 104 may assign permissions to specific audio devices 110 based on stored instructions. As an example, the computer 104 may disallow all permissions from a set of headphones belonging to a youth. Users may assign permissions to specific audio devices 110 (e.g., via user input) or assigned permissions may be pre-stored by the computer 104.

The control parameters may include external events in addition to the position of a user 200. That is, the computer 104 may determine whether control of audio devices 110 is warranted based on detecting an external event. The control parameter lookup table, (e.g., table 1) may specify whether control of audio output is warranted for different external events and, if warranted, to what degree the audio output may be controlled (e.g., pausing, adjusting volume, etc.).

The control parameters may further include vehicle state. The control parameter lookup table (e.g., table 1) may specify how each vehicle state may affect whether control of audio output is warranted and to what degree the computer 104 may control audio output. For example, a "moving" state may have no effect on computer 104 control of audio output. However, a "parked" state may warrant the computer 104 overriding all user 200 permissions such that a driver of the vehicle 102 may speak to each user 200. The affect that vehicle state has on control of audio output may be specified during development of the computer 104 or specified by a user 200 via user input. As an example, the user 200*a* may specify that when the vehicle is in a "highway" state, the computer 104 should control audio output as normal whereas when the vehicle is in an "lane line alert" state (e.g., crossing of lanes detected) the computer 104 is to override all user permissions.

Example Processes

Figure 3:
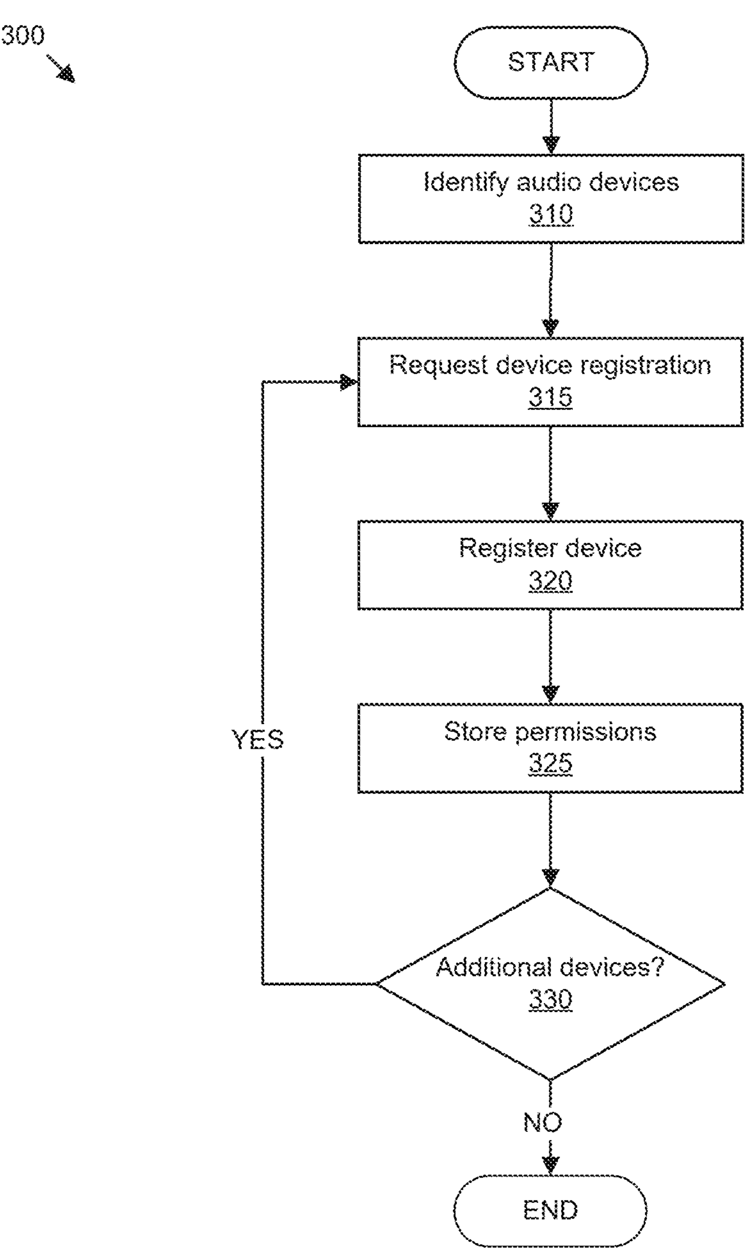
FIG. 3 is a flowchart diagram of an example process to register audio devices.

FIG. 3, described with reference to FIGS. 1-2, illustrates an example process 300 for registering audio devices with the computer 104. The process 300 can be carried out according to program instructions executed by the computer 104.

The process begins in a block 310 in which the computer 104 identifies one or more audio devices 110 in the vehicle 102. As described above, the computer 104 may identify audio devices 110 via stored data (e.g., where the audio devices 110 are vehicle audio devices 110), image data, users establishing communications between the audio device 110 and the computer 104 (e.g., forming pairings via Bluetooth or the like), etc.

Next, in a block 315, the computer 104 requests registration of the device 110. As an example, the computer 104 may require audio devices 110 to register before they are used in the vehicle 102. That is, before the audio device 110 may utilize any vehicle systems (e.g., vehicle infotainment systems), the device 110 typically is registered by the computer 104 such that its audio output can be controlled.

In the block 320, the computer 104 registers the device 110. As described above, registering an audio device 110 means storing its identity (e.g., a network identifier or the like) in a memory or data store of the computer 104, along with an indicator or flag that the computer 104 is provided with authorization to control the audio output of the audio device 110.

Next, in a block 325, the computer 104 stores the permissions associated with the audio device 110. For example, the user 200 of the audio device 110 may specify (e.g., via touchscreen display 108 or the audio device 110) permissions, if any. As further examples, permissions stored in the computer 104 may be based on cabin location, identity of the user 200, or type of audio device 110. Permissions, as described above, specify scenarios where the computer 104 is permitted to control audio output of the audio device 110 (e.g., a permission may disallow control when a specific user 200*b* is attempting to attract the attention of the user 200*a*).

Next, in the block 330, the computer 104 determines whether there are any additional unregistered audio devices 110. If there are further audio devices 110 which are not yet registered, the process returns to block 315. Otherwise the process 300 then ends.

Figure 4:
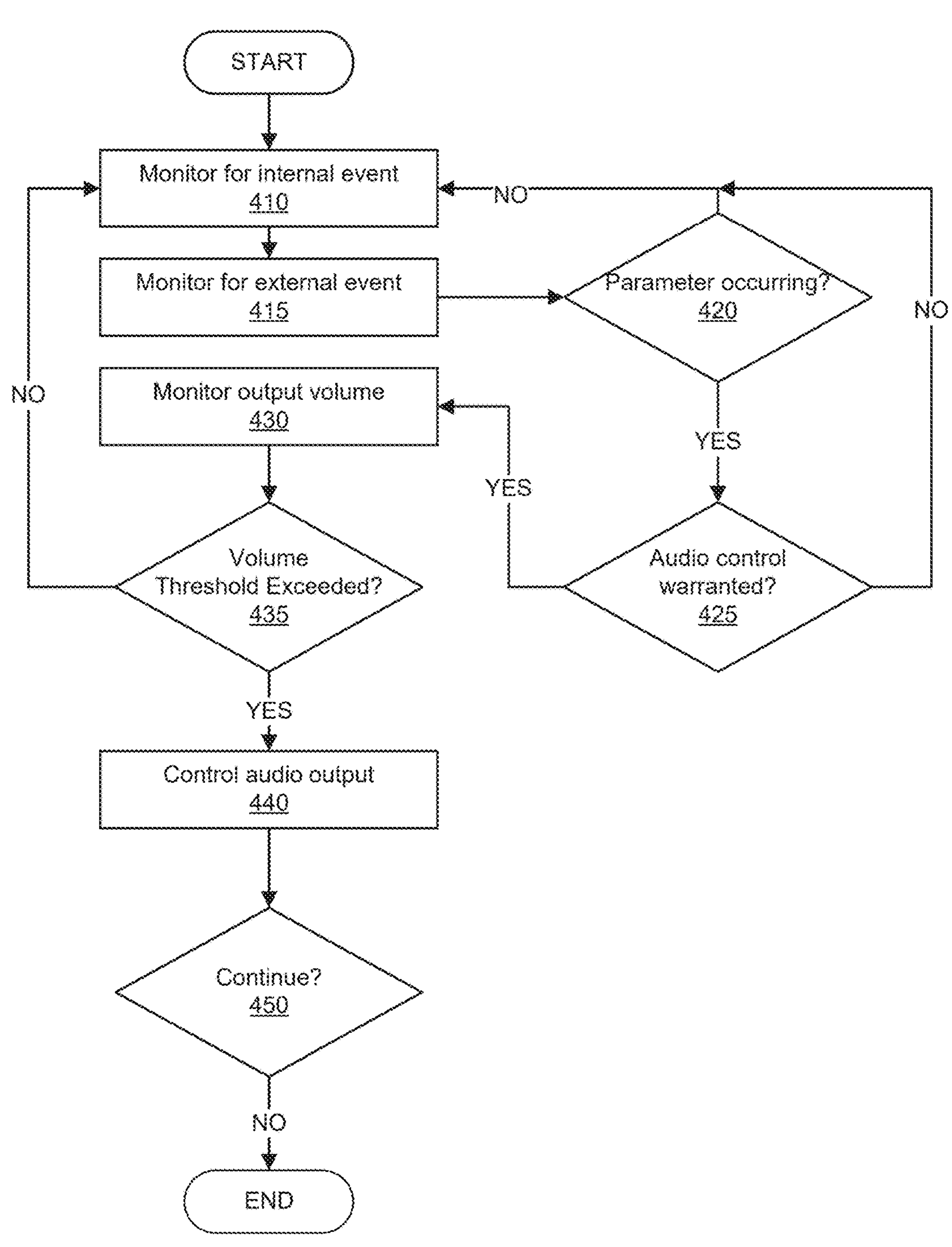
FIG. 4 is a flowchart diagram of an example process to output audio data.

FIG. 4, described with reference to FIGS. 1-2, illustrates an example process 400 for monitoring internal and external events and determining whether control of an audio device 110 is warranted based on the events. The process 400 can be carried out according to program instructions executed by the computer 104 and is typically executed after the registration process 300 has been completed. The process 400 can monitor multiple users 200 and multiple devices 110 simultaneously or concurrently. That is, the computer 104 may perform the process for any number of audio devices 110.

The process 400 begins in decision block 410 in which the computer 104 monitors for internal events. That is, the computer 104 monitors users 200 for user position. The computer 104 actuates sensors 106 to collect image data of the users 200 and analyzes the image data for user positions (e.g., by a neural network). The computer 104 may actuate the sensors 106 to collect image data at a specified framerate (e.g., 60 frames per second) as long as the computer 104 detects users 200 in the vehicle 102.

In a block 415, which is depicted as following the block 410, but which could also be executed concurrently or in parallel with the block 410, the computer 104 monitors for external events. As described above, the computer 104 can detect an external event via any suitable mechanism, such as object detection based on data from sensors 106, vehicle to vehicle or vehicle to infrastructure communications, communication from a remote device 118, etc.

Next, in a decision block 420, the computer 104 determines whether a parameter was detected in any of the blocks 410 and 415 that may trigger a control output for an audio device 110. That is, if in block 410 or block 415 the computer 104 detected an internal event or an external event, the computer 104 may determine that a parameter was detected. If no parameter is detected, the process 400 returns to the block 410 and the computer 104 continues to monitor for internal events and external events, etc. If the computer 104 determines that a parameter was detected, the process 400 continues to a block 425.

In the block 425, the computer 104 determines how to control the output of the audio devices 110. The computer 104 may determine how to control the audio devices 110 based on the outputs specified for parameters in a lookup table (e.g., table 1). The computer 104 may consider one or more occurring parameters and control the audio output as specified by the table. The table may specify that audio control is not warranted for specific events or combinations of events. If audio control is not warranted, the process 400 returns to block 410 to continue monitoring for parameters. Otherwise, the process 400 continues to a block 430.

In a block 430, the computer 104 monitors the volume of the audio device 110. Volume may be measured in decibels. Volume is measured may be detected by any suitable means such as an audio sensor 106 (e.g., a microphone), electro-acoustic measurement, etc.

In a decision block 435, the computer 104 determines whether the volume of the audio output of the audio device 110, measured in the block 430, meets or exceed the volume threshold as described above. The threshold may be pre-stored by the computer 104 or may be selected by a user 200. If the volume of the audio output does not meet or exceed the threshold (e.g., the volume is presumably low enough to not impede the user's 200 hearing of other users 200*b*) then the process 400 returns to block 410 to continue monitoring for parameters. Otherwise, the process 400 continues to a block 440.

In the block 440, the computer 104 has determined that the audio output meets or exceeds the volume threshold. Next, the computer 104 controls the audio output of the audio device 110 as described above (e.g., to lower the volume of the audio output, to pause the audio output, etc.)

Next, in a block 450, the computer 104 determines whether to continue the process 400. For example, once the process 400 is initiated, the computer 104 may continue to monitor for parameters by returning to block 410. However, the process 400 may end upon some input or event to terminate the process 400 such as a user 200 ceasing operation of the vehicle 102 (e.g., turning off a propulsion system such as an engine), a user 200 providing input to end the process 400, etc. If the process 400 is to continue, then the process returns to the block 410, otherwise the process 400 ends.

Computing devices such as those discussed herein generally each includes commands executable by one or more computing devices such as those identified above, and for carrying out blocks or steps of processes described above. For example, process blocks discussed above may be embodied as computer executable commands.

Computer executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (i.e., a microprocessor) receives commands (i.e., from a memory, a computer readable medium, etc.) and executes these commands, thereby performing one or more processes, including one or more of the processes described herein. Such commands and other data may be stored in files and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer 104 (i.e., by a processor of a computer 104). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer 104. Common forms of computer-readable media include, for example, RAM, a PROM, an EPROM, a FLASH-EEPROM, any other memory chip or cartridge, or any other medium from which a computer 104 can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

In the drawings, the same candidate numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Use of in response to, based on, and upon determining herein indicates a causal relationship, not merely a temporal relationship. "Based on" or "in response to" can mean based at least partly on or at least partly in response to unless explicitly stated otherwise.

Examples are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the Figures should not be viewed as limiting. It should be understood that other embodiments might include more or less of each element shown in a given Figure. Additionally, some of the illustrated elements may be combined or omitted. Yet further, an example embodiment may include elements that are not illustrated in the Figures.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The adjectives "first" and "second" are used throughout this document as identifiers and are not intended to signify importance, order, or quantity. Use of "in response to," "upon determining," etc. indicates a causal relationship, not merely a temporal relationship. Operations, systems, and methods described herein should always be implemented and/or performed in accordance with an applicable user's manual and/or guidelines.

The invention claimed is:

1. A system comprising a computer including a processor and a memory, the memory storing instructions executable by the processor to:

associate a first audio device with a first user and a second audio device with a second user;

output a first audio stream for a first user via the first audio device and a second audio stream for a second user via the second audio device; and based on a user position of the first user, control the output of the second audio stream provided to the second user via the second audio device independently of controlling the output of the first audio stream provided to the first user via the first audio device.

2. The system of claim 1, wherein the user position is a gesture including a head, hand, and/or arm of the first user.

3. The system of claim 1, wherein the user position is an eye movement.

4. The system of claim 3, wherein the eye movement is an adjustment of the eye of the first user to a viewing direction toward a vehicle component.

5. The system of claim 3, wherein the eye movement is an adjustment of the eye of the first user to a viewing direction toward the second user.

6. The system of claim 1, the instructions further including instructions to control the audio output based on an external event in addition to the user position of the first user.

7. The system of claim 6, wherein the external event is a proximity of another vehicle.

8. The system of claim 6, wherein the external event is a traffic condition.

9. The system of claim 1, the instructions further including instructions to control the output of the second audio stream based on a predetermined permission.

10. The system of claim 9, wherein the permission is based on input by the second user.

11. The system of claim 9, wherein the permission is based on input by the first user.

12. The system of claim 1, wherein controlling the output of the second audio stream includes adjusting a volume of the audio output.

13. The system of claim 1, wherein controlling the output of the second audio stream includes pausing the audio output.

14. The system of claim 1, wherein controlling the output of the second audio stream includes changing the audio output from a first audio program to a second audio program.

15. The system of claim 1, the instructions further including instructions to control the output of the second audio stream only when a volume of the output of the second audio stream is above a specified volume threshold.

16. A method comprising:

associate a first audio device with a first user and a second audio device with a second user;

output a first audio stream for a first user via the first audio device and a second audio stream for a second user via the second audio device; and based on a user position of the first user, controlling the output of the second audio stream provided to the second user via the second audio device independently of controlling the output of the first audio stream provided to the first user via the first audio device.

17. The method of claim 16, wherein the user position is a gesture including a head, hand, and/or arm of the first user.

18. The method of claim 16, wherein the user position is an eye movement.

19. The method of claim 16, further comprising controlling the output of the second audio stream based on an external event in addition to the user position of the first user.

20. The method of claim 16, further comprising controlling the output of the second audio stream based on a predetermined permission.

* * * * *